United States Patent

Yabe et al.

[11] Patent Number: 5,983,202
[45] Date of Patent: Nov. 9, 1999

[54] OFFICE-SUPPLIES MANAGEMENT SYSTEM

[75] Inventors: Tooru Yabe, Omiya; Yoku Hoshino, Chiba, both of Japan

[73] Assignee: Kokuyo Co., Ltd., Osaka, Japan

[21] Appl. No.: 08/626,106

[22] Filed: Apr. 3, 1996

[30] Foreign Application Priority Data

Nov. 30, 1995 [JP] Japan .................................. 7-311763

[51] Int. Cl.⁶ .................................................. G06F 15/00
[52] U.S. Cl. .......................... 705/28; 395/228; 235/385; 364/478.03; 364/478.04; 364/479.06; 364/479.07
[58] Field of Search ................................ 705/28, 26, 27, 705/29; 221/13; 364/403, 406, 478.01, 478.02, 478.03, 478.04, 478.13, 479.01, 479.02, 479.06, 479.07; 395/210, 228, 925, 222, 226, 227; 235/385

[56] References Cited

U.S. PATENT DOCUMENTS

| | | | |
|---|---|---|---|
| 4,519,522 | 5/1985 | McElwee | 221/13 |
| 4,563,739 | 1/1986 | Gerpheide et al. | 364/403 |
| 4,621,325 | 11/1986 | Naftzger et al. | 364/406 |
| 4,783,740 | 11/1988 | Ishizawa et al. | 364/403 |
| 5,186,281 | 2/1993 | Jenkins | 186/55 |
| 5,319,544 | 6/1994 | Schmerer et al. | 364/403 |
| 5,537,313 | 7/1996 | Pirelli | 364/403 |
| 5,611,051 | 3/1997 | Pirelli | 395/210 |
| 5,646,389 | 7/1997 | Bravman et al. | 235/385 |
| 5,712,989 | 1/1998 | Johnson et al. | 395/228 |

FOREIGN PATENT DOCUMENTS

| | | |
|---|---|---|
| 3632754 | 3/1988 | Germany . |
| 4142703 | 6/1993 | Germany . |
| 63-242806 | 10/1988 | Japan . |
| 3-218563 | 9/1991 | Japan . |
| 5-046637 | 2/1993 | Japan . |
| 6-316313 | 11/1994 | Japan . |

Primary Examiner—Vincent N. Trans
Assistant Examiner—Russell W. Frejd
Attorney, Agent, or Firm—Lowe Hauptman Gopstein Gilman & Berner

[57] ABSTRACT

An office-supplies management system includes: an office-supplies managing apparatus disposed together with office supplies in an office-supplies supplying area in which entrance and exit of members are controlled by an entering/exiting member control apparatus which is unlocked when a specific member identification code is inputted; and a plurality of terminals for members connected to the office-supplies managing apparatus through a network, wherein the office-supplies managing apparatus includes a stock-information storage unit for storing stock-related information such as information on a stock of office supplies which are supplied to the members, a function of updating the stock at the time of stocking-in and supplying for ascertaining codes of office supplies and updating stock information when the office supplies are replenished and stocked into the office-supplies supplying area, and when the office supplies are supplied, and a function of outputting stock information for outputting the stock-related information stored in the stock-information storage unit upon receipt of a stock-information request command transmitted from the terminal for a member.

3 Claims, 6 Drawing Sheets

OFFICE-SUPPLIES MANAGEMENT SYSTEM

BACKGROUND OF THE INVENTION

1. Field of the Invention:

The present invention relates to an office-supplies management system, and more particularly to an office-supplies management system for unattendedly managing office supplies which are supplied to members of an office, and for allowing information on office supplies required by the office members to be readily obtained by the office members.

2. Description of the Related Art:

Conventionally, various organizations such as business corporations consume various office supplies and daily necessities at the cost of the organizations themselves in executing their activities. Operations including the procurement and purchase, stocking, and supplying of the office supplies and the like are indirect and auxiliary to the activities of the organizations, but they are operations which cannot be dispensed with.

As one form of such operations, if there is marketability sufficient for opening a store within an office, the organization may entrust the entire relevant operations with an outside company. There, various techniques of store sale by clerks are used, and, for example, stock control and order issuance using a POS system, as well as supply (sale) using IC cards, are employed.

In general, however, the situation is such that personnel in charge of office supplies in the organization still continue to conduct ordering, stocking, and supplying operations as their own activities.

With respect to the issuance of orders, stock control, and supply of office supplies within an organization, a system has not yet been developed for performing such operations through effective use of information-related techniques by regarding such operations as a series of process. In particular, an office-supplies management system for unattendedly managing office supplies which are supplied to members of an office, and for allowing information on office supplies required by the office members to be readily obtained by the office members is not yet known.

SUMMARY OF THE INVENTION

Accordingly, an object of the present invention is to provide an office-supplies management system which systemizes the management and supply of office supplies within an organization, and whereby information on office supplies required by members of the organization can be confirmed at terminals which are used by the members.

To this end, in the present invention, there is provided an office-supplies managing apparatus capable of effecting the supply of office supplies in an unattended manner and for updating stock information each time the office supplies are supplied or replenished. Moreover, this office-supplies managing apparatus is disposed in an office-supplies supplying area together with the office supplies to be supplied. This office-supplies supplying area is arranged such that entrance and exit of members are controlled by an entering/exiting member control apparatus which is unlocked when a specific member identification code is inputted.

In addition, the office-supplies managing apparatus is connected through a network to a plurality of terminals for members which are placed within reach by the members to whom the office supplies are supplied. Each of these terminals for members is provided with a function of out-putting to the office-supplies managing apparatus a stock-information request command and a user-information request command in response to an input by the member. For this reason, the office-supplies managing apparatus outputs to the terminal for a member who made the request stock information which is updated each time the office supplies are supplied, information on results of use by user group to which the members belong, which is calculated on the basis of the stock information, and information on average results of use. Accordingly, by merely operating the terminal at hand, the member is capable of confirming whether there is a stock of the desired office supplies in the office-supplies supplying area, and of obtaining information on various statistics for management.

Further, with respect to the nonpermanently stocked products which are not permanently stocked products which are constantly stocked in the office-supplies supplying area, information on the occurrence of a demand for nonpermanently stocked products is outputted by the terminal for a member, and this demand-occurrence information is received by the terminal for a member having the authority of approval, and is approved thereby. The approval information together with the demand-occurrence information is outputted to the terminal of a member in charge of purchasing through the network.

When the nonpermanently stocked products are supplied to the office-supplies supplying area, the nonpermanently stocked products are stored in the locker. This locker has an opening/closing controlling means and a display means, and when the member from whom the demand for the nonpermanently stocked products occurred inputs the order number of the nonpermanently stocked products to the office-supplies managing apparatus, the office-supplies managing apparatus outputs an unlocking command to the locker corresponding to the order number. Upon receipt of the unlocking command, the locker unlocks the opening/closing controlling means, and lights up the display means, so that the member can open the locker which is lit up, and can receive the nonpermanently stocked products.

An office-supplies management system in accordance with the present invention comprises: an office-supplies managing apparatus disposed together with office supplies in an office-supplies supplying area in which entrance and exit of members are controlled by an entering/exiting member control apparatus which is unlocked when a specific member identification code is inputted; and a plurality of terminals for members connected to the office-supplies managing apparatus through a network. Here, the office-supplies managing apparatus includes a stock-information storage unit for storing stock-related information such as information on a stock of office supplies which are supplied to the members, a function of updating the stock at the time of stocking-in and supplying for ascertaining codes of office supplies and updating stock information when the office supplies are replenished and stocked into the office-supplies supplying area, and when the office supplies are supplied, and a function of outputting stock information for outputting the stock-related information stored in the stock-information storage unit upon receipt of a stock-information request command transmitted from the terminal for a member.

A handy terminal for effecting data transfer with respect to the office-supplies managing apparatus is Juxtaposed to the office-supplies managing apparatus in the above-described system. The handy terminal has a stocked-articles-quantity storage unit for storing a quantity inputted for each code of the office supplies, and the office-supplies managing apparatus has a function of updating the stock at the time of inventory-taking for reading information on quantities of stocked articles from the stocked-articles-quantity storage unit, and for updating stock information in the stock-information storage unit on the basis of the information on the quantities of stocked articles. Here, the office-supplies managing apparatus is preferably provided with a function of calculating inventory-differential information for calculating a differential between the information on the quantities of stocked articles read out from the stocked-articles-quantity storage unit and the stock information stored in the stock-information storage unit, and for storing a calculated result in the stock-information storage unit as the stock-related information.

The office-supplies managing apparatus of the above-described system is provided with a function of calculating a replenishing quantity so as to calculate quantities of office supplies to be replenished to the office-supplies supplying area on the basis of the stock information stored in the stock-information storage unit and ordering-point information on each predetermined item of office supplies, and to store a calculated result to the stock-information storage unit as the stock-related information.

The office-supplies managing apparatus is further provided with a function of updating user information whereby, when the office supplies are supplied, member affiliation information on the member to whom the office supplies are supplied is ascertained together with codes on the office supplies, and the user information stored in a user-information storage unit juxtaposed to the stock-information storage unit is updated. Here, the office-supplies managing apparatus is preferably provided with a function of outputting user information whereby when a user-information request command is transmitted thereto from the terminal for a member, the user information stored in the user-information storage unit is outputted to the terminal for a member. In addition, the office-supplies managing apparatus is preferably provided with a function of preparing a list of results of use by each user group whereby, on the basis of member affiliation information, the quantities of office supplies supplied by each user group or department, which are specified by the member affiliation information, are calculated, and the quantities of office supplies supplied by each user group is stored in the user-information storage unit as the user information. Further, the office-supplies managing apparatus is preferably provided with a function of preparing a list of average results of use whereby, on the basis of member affiliation information, an average quantity of office supplies supplied per member for a fixed period is calculated, and the average quantity of office supplies supplied is stored in the user-information storage unit as the user information.

The terminal for a member may be provided with a function of controlling the display of electronic catalog information so as to output electronic catalog information in which types of various office supplies arranged in the office-supplies supplying area as permanently stocked products are stored; a display for displaying the electronic catalog information outputted by the function of controlling the display of electronic catalog information; and a function of requesting by-type stock information so as to output as office supply codes the types of office supplies entered by the member together with the stock-information request command to the office-supplies managing apparatus in correspondence with the electronic catalog information displayed on the display, wherein the office-supplies managing apparatus is provided with a function of retrieving by-type stock information so as to retrieve stock information on the office supplies corresponding to a relevant office supply code from the stock-information storage unit on the basis of the office supply code transmitted from the function of requesting by-type stock information. Here, the terminal for a member is preferably provided with a slip-forming function for transmitting demand-occurrence information on nonpermanently stocked products, which are not stocked as the permanently stocked products in the office-supplies supplying area, to another terminal for a predetermined member, a function of controlling the display of demand-occurrence information so as to output the demand-occurrence information to the display upon receiving the demand-occurrence information outputted by the slip-forming function, and an approval function for outputting to the outside approval information, inputted in response to the demand-occurrence information, together with the demand-occurrence information.

A plurality of lockers for storing nonpermanently stocked products which are not stocked as the permanently stocked products are installed in the office-supplies supplying area in the above-described system. Each of the lockers includes opening/closing controlling means which is unlocked upon receipt of a predetermined unlocking command and display means which lights up when the opening/closing means is unlocked. Meanwhile, the office-supplies managing apparatus is provided with a function of supplying nonpermanently stocked products so as to output the unlocking command to the locker when an order number of the nonpermanently stocked product is inputted, and to update the stock information in the stock-information storage unit.

The offices supplies which are subject to management in the present invention are office expendables and daily commodities which are used in an office, and are broadly classified into permanently stocked products and nonpermanently stocked products. The term "permanently stocked products" used in this specification and in the appended claims refers to a group of specified commodities which are continuously consumed on a daily basis, and the other group of nonspecified commodities which are consumed irregularly are referred to as the "nonpermanetly stocked products." These office supplies are concentrated in one location and are managed unattendedly. An area for that corner or a room or the like will be referred to as an office-supplies supplying area or an office supplies center (OSC).

The above and other objects, features and advantages of the present invention will become more apparent from the following detailed description of the invention when read in conjunction with the accompanying drawings.

DESCRIPTION OF THE PREFERRED EMBODIMENT

Hereafter, referring to the accompanying drawings, a description will be given of an embodiment of the office-supplies management system in accordance with the present invention.

Figure 1:
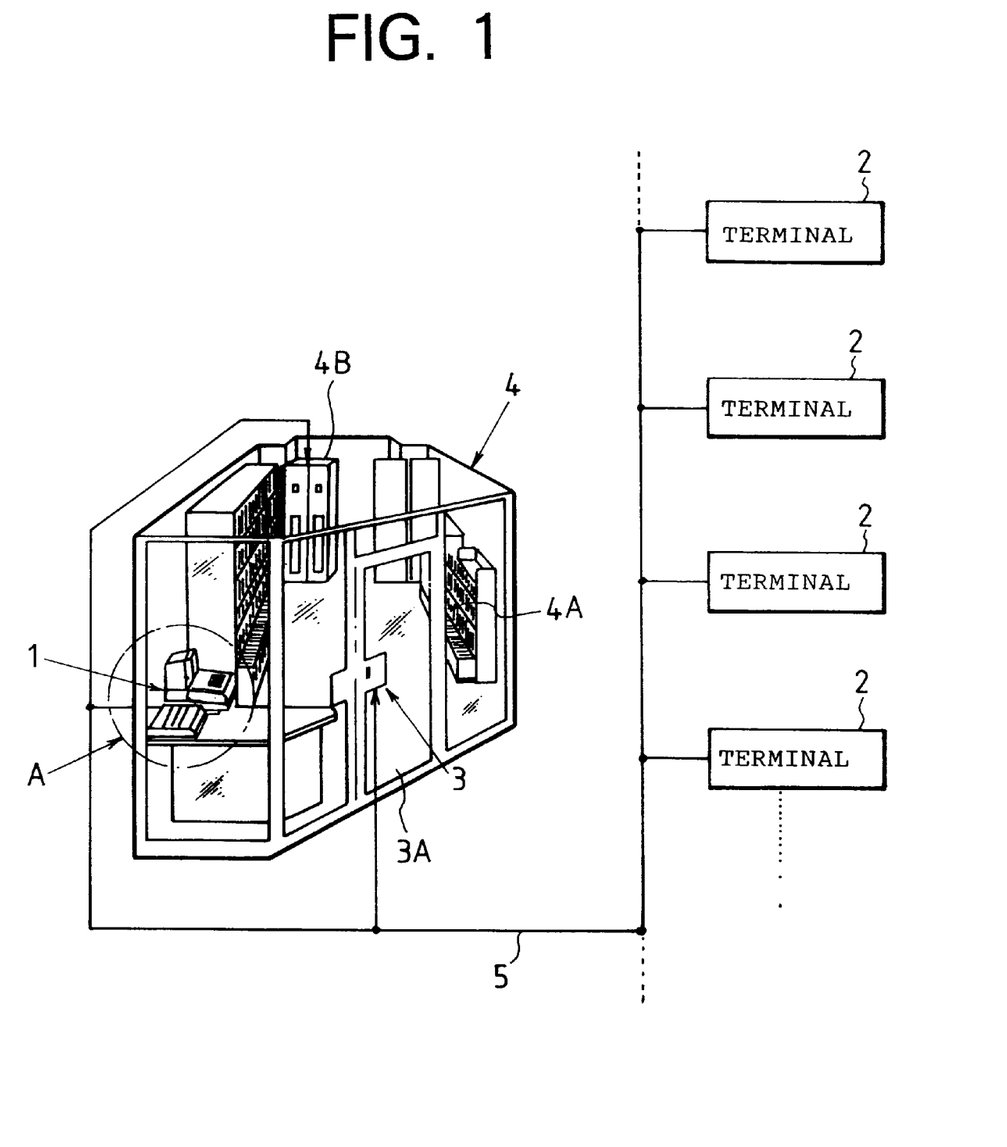
FIG. 1 is a schematic diagram of an office-supplies management system in accordance with the present invention.

FIG. 1 shows a schematic diagram of an office-supplies management system in accordance with the embodiment. In this drawing, the office-supplies managing apparatus is comprised of an office-supplies managing apparatus 1 disposed together with office supplies and a plurality of terminals 2 for members which are connected to the office-supplies managing apparatus 1 via a network.

The office-supplies managing apparatus 1 is disposed in an office-supplies supplying area (hereafter referred to as the OSC as necessary) 4 where the entrance or exit of an office member is controlled by an entering/exiting member control apparatus 3 which is unlocked when a particular member identification code is inputted thereto. This OSC 4 consists of two sections, i.e., a display section 4A where permanently stocked products are displayed, and a stockyard and nonpermanently-stocked-product delivering lockers 4B.

An arrangement is provided such that the members of an organization need not keep a stock of expendables with them or in the vicinity of their department, with the exception of office supplies being used by individuals. As for the permanently stocked products in the OSC 4, the terminals 2 for members which are placed within reach by the members are connected to the office-supplies managing apparatus 1 in the OSC 4 by a network 5 consisting of a local area network (LAN) or the like, and by using these terminals 2 the members of the organization are able to confirm the stock or obtain various information controlled by the office-supplies managing apparatus 1. Here, the terminals 2 for members are comprised of personal computers, as well as a server for controlling the LAN, an ordering system connected to a supplier of office supplies, and the like.

In the confirmation of the stock and the state of use by the terminal 2 for a member, the following are displayed: stocking in, stocking out, and a balance after regular processing, standard volumes of stocks, ordering points, and minimum units of orders, as well as average results of use per month per person and results of use by each user group. In addition, an electronic catalog or the like for facilitating the confirmation of the stock are also recorded in the terminals 2 for members. The electronic catalog may be prepared in the form of an external storage device (e.g., a CD-ROM) for each terminal 2.

As for the nonpermanently stocked products, purchase request processing is carried out by using the aforementioned terminal 2 for a member. An electronic slip of the purchase request is approved by means of the terminal 2 for a member who has the authority of approval, and is then sent to the terminal 2 of a member who is in charge of purchase, such as a clerk in charge of general affairs. Meanwhile, as for the permanently stocked products, it suffices if a person in need may go to the OSC 4 to fetch a necessary quantity of such products when necessary, irrespective of the presence or absence of a procedure of request at the time of the need and a superior's approval thereof, and the presence or absence of the use of the communication and computer processing technology as a method thereof.

The entering/exiting member control apparatus 3 is adapted to interlock with and open an electronic lock of an entrance/exit door 3A to allow only specified persons to enter the OSC 4, and includes a storage function for recording that fact. The recorded information is transferred to a storage device 12 (see FIG. 2) of the office-supplies managing apparatus 1, connected to the entering/exiting member control apparatus 3 via a communication line by a fixed method, or to an external storage device FD or the like, and is then erasable. The entering/exiting member control apparatus 3 also has the function of issuing an alarm when the entrance/exit door 3A is left open for more than a fixed time, so as to urge the closing of the door. Further, the lock of the entrance/exit door 3A is arranged to be automatically locked. Incidentally, the person who entered and exits the OSC 4 inputs information on facts including the product the person took out into the office-supplies managing apparatus 1.

Figure 2:
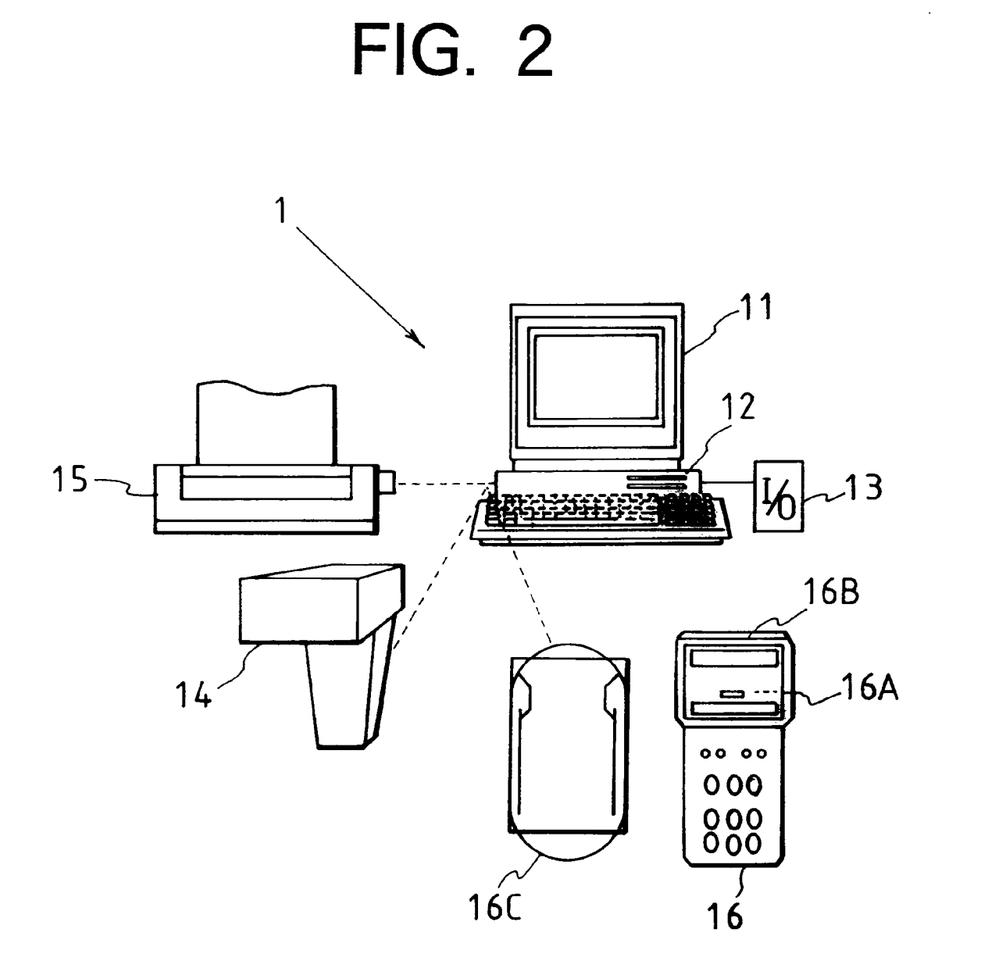
FIG. 2 is a schematic diagram of the details of a portion A in FIG. 1.

FIG. 2 is a detailed schematic diagram of the section A shown in FIG. 1, and illustrates a specific configuration of the office-supplies managing apparatus 1. As shown in the drawing, the office-supplies managing apparatus 1 is comprised of a main computing processing unit 11 for controlling the updating of various information and data transfer through the network; the storage device 12 for storing information on stocks and users; an I/O processor 13; a bar-code scanner 14 for replenishing the office supplies by reading bar codes attached to the office supplies; a printer 15 for outputting various information on the storage device 12; a portable handy terminal 16 for effecting predetermined data transfer; and a receiver 16C for receiving the handy terminal 16. Although not shown in the drawings, the office-supplies managing apparatus 1 is further comprised of a receipt-issuing device or a printer for issuing receipts on the supplied office supplies or printing various information, a communication network apparatus for converting data concerning stock information and the like to perform data transfer, and for establishing connection to a cable, and so on, as necessary.

The functions of the system based on the above-described office-supplies managing apparatus 1 include the function of managing individual users or user groups as a master management and maintenance function; the function of managing commodities; the management processing function of a management master for setting various selection functions in the implementation of the system; a stocking-in processing function; a delivery processing function; an inventory-differential correction processing function; and an order-information ascertaining function based on an ordering-point control system.

In addition, as the function of preparing control information, the office-supplies managing apparatus 1 has the function of preparing, outputting and processing various forms, such as history lists, a list of overdue replenishment requests, a list of stock, a list of unchanging commodities, a ranking of results of commodities actually used, a detailed version of the results of use by each user group, a summary version of the results of use by each user group, a list of results of use by each user group and by type of ledger, and so on.

Further, in order to support the system, the office-supplies managing apparatus 1 has the function of data erasure processing for securing an area for history data, the function of copying data to an external storage device, such as a floppy disk, so as to utilize the history data in other uses, and the function of backing up the system and data.

Furthermore, the office-supplies managing apparatus 1 has the functions of data transfer with the terminal 2 of another server or the like through the communication network, the processing of collation with an ID code recorded in the entering/exiting member control apparatus 3, processing interlocked with a means for opening and closing the locker for special nonpermanently stocked products, and the like. Incidentally, the aforementioned functions provided are not limited to the office-supplies managing apparatus 1, and may be provided in the terminals 2 for members, the server, or the like in the network by the use of communication technology.

In this embodiment, since the office-supplies managing apparatus 1 and the terminals 2 for members are connected to each other via the network 5, information on the office supplies required by the members can be confirmed by the terminals 2 being used by the members. For this reason, it is possible to reduce the personnel cost involved in the series of operations and management concerning the management and supply of the office supplies, reduce the space cost and inventory cost, and hence lower the management cost.

Further, since the facts on supply of office supplies are processed as information in a form in which the data can be transformed, it is possible to establish a management system based on data, and improve the business-executing speed by lowering the responsibility and authority concerning the supply of office supplies to the rank and file, and imbue trust among the members of the organization.

Next, also referring to FIGS. 3 to 6, a detailed description will be given of the relationships among the various functions provided in the aforementioned apparatuses.

Figure 3:
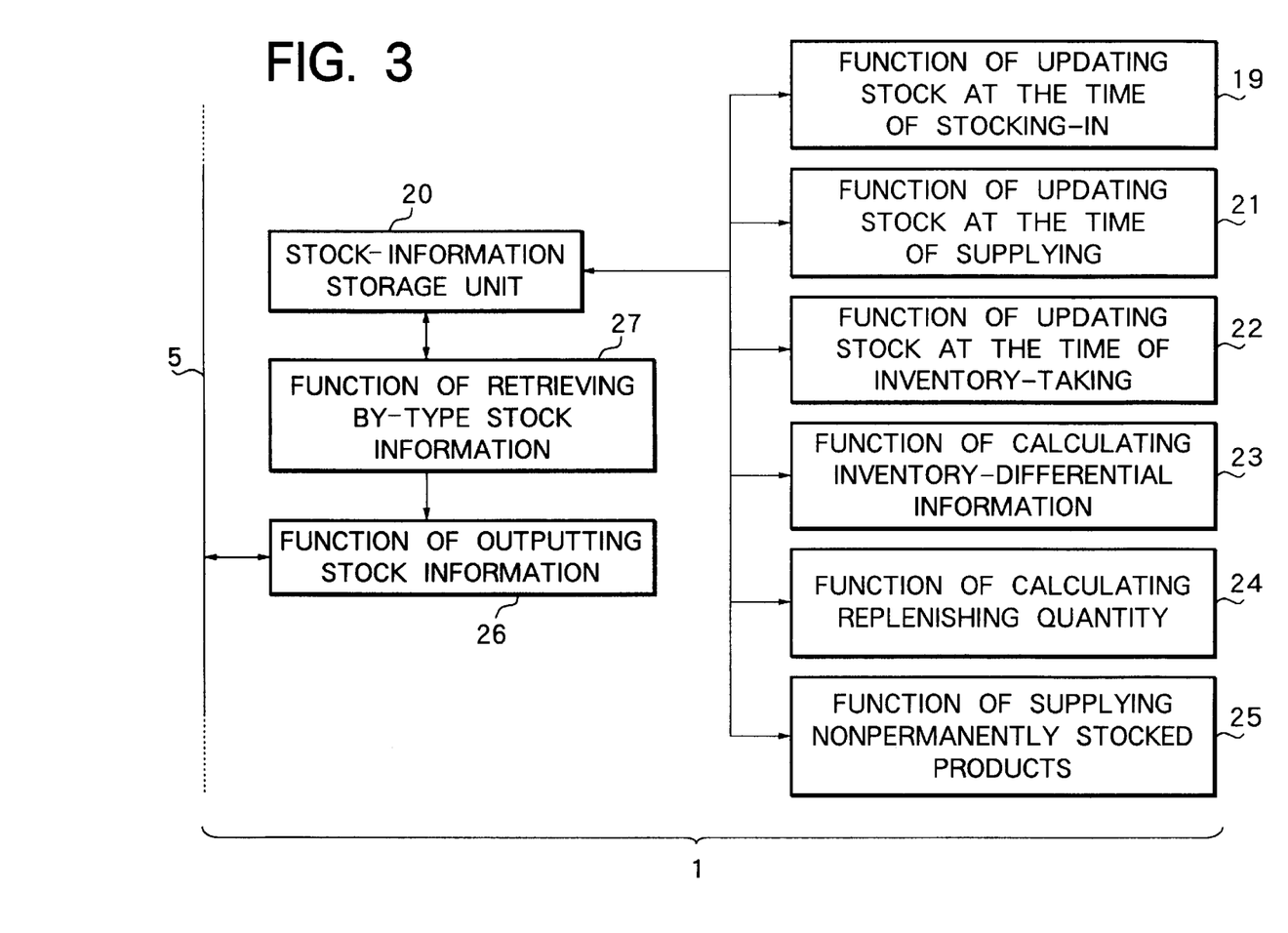
FIG. 3 is a block diagram illustrating a configuration of various functions related to stock information in an office-supplies managing apparatus.

FIG. 3 shows a functional block diagram illustrating a configuration of the office-supplies managing apparatus 1 related to the stock information. As shown in the drawing, the office-supplies managing apparatus 1 is provided with a stock-information storage unit 20 for storing stock-related information such as information on the stock of office supplies which are supplied to the members; a function 19 of updating the stock at the time of stocking-in so as to update stock information on office supplies for each code when the commodities are replenished upon arrival at the OSC; a function 21 of updating the stock at the time of supplying so as to update stock information by reading a code on the relevant office supplies when supplying the office supplies; and a function 26 of outputting stock information so as to output the stock-related information stored in the stock-information storage unit 20 to the relevant terminal 2 for a member when a stock-information request command sent from the terminal 2 for a member has been received.

Stock information indicating the quantity of each item of office supplies supplied when the office supplies are supplied to the OSC 4 is stored in the stock-information storage unit 20. This stock information is updated when the office supplies are supplied to the member and when the office supplies are supplied to the OSC 4, respectively. In addition, the stock-information storage unit 20 is provided with the function of updating the stock information in units of accounting processing periods in view of management of the organization.

The registration to the office-supplies managing apparatus 1 by using the function 21 of updating the stock at the time of supplying is effected by inputting a code for identifying the member, by scanning the bar code of the commodity by means of the bar-code scanner 14, and by pressing a predetermined "confirmation key" and an "end key."

As for commodities, a bar code marked on each article is used as an identification code. This code is a unique code which corresponds to each individual commodity and does not overlap with others as in the case of the Japanese Article Number (JAN) code, and is registered in advance with the office-supplies managing apparatus 1.

If articles are not marked with bar codes, or bar codes cannot be provided thereon, it is possible to adopt a method in which registrations are made in advance with respect to input keys or portions of an input panel of the office-supplies managing apparatus 1 and are used, or arbitrary unique JAN codes or the like in which check digits and the like are calculated by a predetermined method are generated, and a list formed by converting the generated codes into bar codes and by outputting the same is placed near the office-supplies managing apparatus 1, and is scanned for convenience' sake. Incidentally, as for nonpermanently stocked products, since order numbers are used for keys for processing, the order numbers are entered through a keyboard.

In addition, the aforementioned handy terminal 16 has a stocked-articles-quantity storage unit 16A (see FIG. 2) for storing the commodity codes, scanned by a bar-code scanner unit 16B, and the quantities inputted for the respective commodity codes. The office-supplies managing apparatus 1 has a function 22 of updating the stock at the time of inventory-taking for reading information on the quantities of stocked articles from the stocked-articles-quantity storage unit 16A via the receiver 16C of the handy terminal 16, and for updating stock information on the basis of the information on the quantities of stocked articles.

The confirmation of inventoried stock, which is the confirmation of the quantities of stocked articles, is effected by means of the aforementioned handy terminal 16. Data can be collected by scanning the commodity codes on the basis of the bar codes provided on the articles or displayed on shelves and by inputting the actual number of articles stocked. This data is uploaded to the office-supplies managing apparatus 1 so as to be collated with commodity stock master (stock information) stored in the office-supplies managing apparatus 1. If the supply of office supplies is being carried out properly, the actual number of articles stocked and the stock information will essentially agree with each other.

In general, an organization has regulations which prohibit the damaging, wasting, or making into personal effects of fixtures, equipment, and the like of the organization. The idea of this OSC 4 is also based on the ethical doctrine that man's, i.e., members', inborn nature is good. In fact, however, it is conceivable that the members may take out the articles in the OSC 4 without registrations in the office-supplies managing apparatus 1, or may take out more than a necessary quantity. To ascertain and reduce such happenings, the following contrivances and functions are provided.

That is, as shown in FIG. 3, the office-supplies managing apparatus 1 has a function 23 of calculating inventory-differential information for calculating the differential between the information on the quantities of stocked articles read out from the stocked-articles-quantity storage unit 16A and the stock information stored in the stock-information storage unit 20, and for storing the calculated result in the stock-information storage unit as stock-related information. For this reason, the result of calculation by the function 23 of calculating inventory-differential information is outputted to the terminal 2 for a member from a function 26 of outputting stock information in response to a request from the terminal 2 for a member.

As the inventory differential is inputted to and stored in the office-supplies managing apparatus 1 as differential data, this data is used for the analysis of commodities, timings, quantities, and the like concerning illicit acts and errors which are liable to occur statistically, as well as for correlational analysis by comparison with information on the results of stocked-out articles.

The entering/exiting member ID's which are stored in a security device of the entrance/exit door 3A when members entered or left the OSC 4 are periodically outputted to the office-supplies managing apparatus 1 through communication, an external storage device FD, or the like, and are collated with department codes in commodity paying-out records (history information), thereby making it possible to ascertain information on cases where even if a member entered and left the OSC 4, and yet failed to pay out on stocking out.

Further, by using the office-supplies managing apparatus 1, a standard volume of consumption per item per month by each member is statistically determined and is set as a reference value. On the basis of this data, it is possible to monitor abnormal values in management.

In addition, the office-supplies managing apparatus 1 has a function 24 of calculating a replenishing quantity so as to calculate the quantities of office supplies to be replenished to the OSC 4 on the basis of the stock information stored in the stock-information storage unit 20 and the ordering-point information on each predetermined item of office supplies, and to store the calculated result to the stock-information storage unit as stock-related information. Accordingly, the result of calculation by the function 24 of calculating a replenishing quantity is outputted to the terminal 2 for a member by means of the function 26 of outputting stock information, in response to a request from the terminal 2 for a member, such as a person in charge of ordering.

The operation of ordering office expendables on the part of the organization involves the operation of replenishing commodities to the OSC 4 with regard to permanently stocked products. The checking of the volumes of articles stocked and the determination of the volumes to be replenished for this purpose is carried out on the information fetched from the office-supplies managing apparatus 1, or by confirming the quantities of stocked articles. The operation itself may be entrusted to a supplier. In this case, the supplier who is entrusted with periodically visits the office.

The differential between the stock information and the inventoried stock in the office-supplies managing apparatus 1 is inputted as "differential data" after being confirmed, with the result that the present quantities and the stocked-out quantities can be confirmed. If the stocked-out quantities and the present quantities are confirmed, from the information on ordering points and order units it is possible to calculate which items should be replenished and in what quantities. On the basis of the calculated results, the supplier assumes that an order for commodities has been received, and may effect the processing of shipment, transport, and delivery. In addition, at the time of arrival, the articles are set on shelves, and the stocking-in information is inputted to the office-supplies managing apparatus 1.

Figure 4:
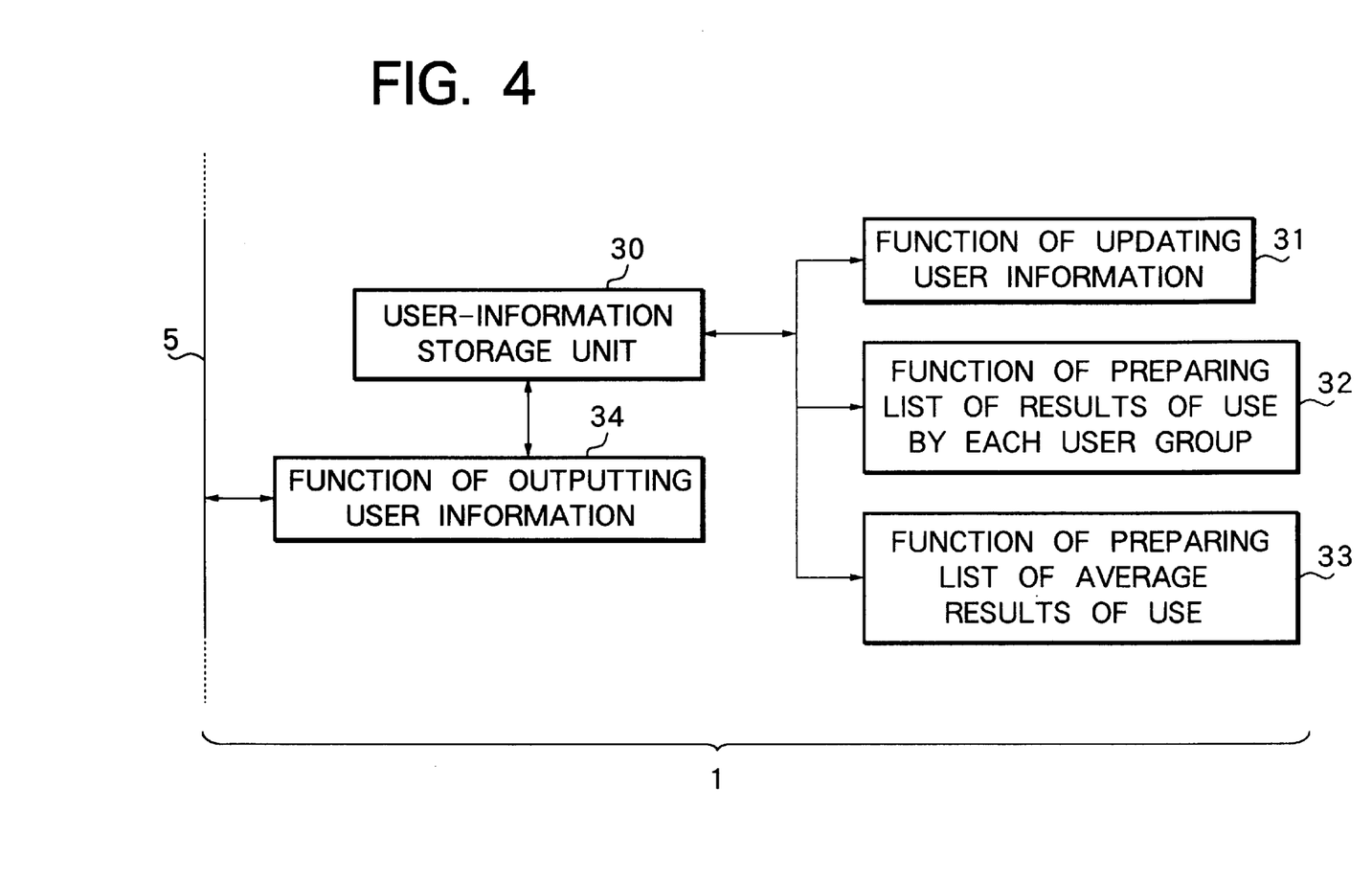
FIG. 4 is a block diagram illustrating a configuration of various functions related to user information in the office-supplies managing apparatus.

FIG. 4 shows a functional block diagram illustrating a configuration of the office-supplies managing apparatus 1 concerning user information. In the drawing, the office-supplies managing apparatus 1 is provided with a user-information storage unit 30 for storing user information which is information on members which received the office supplies, and a function 31 of updating user information whereby, when the office supplies are supplied, member affiliation information on the member to whom the office supplies are supplied is ascertained together with codes on the office supplies, and the user information is updated.

The user information includes data on an identification code of a member, the code of the item of the office supplies supplied, the quantity, the amount, the date of supply, and so on. In this embodiment, it is assumed that the identification code of a member includes a code of a department to which the member belongs. As for the department code, it suffices if departments are codified on the basis of at least minimum units concerning which the organization is to manage the budgets and expenses for office expendables and the like.

The function 31 of updating user information ascertains member affiliation information including the identification code of the member and his or her department code when the office supplies are supplied. As an input method, it is possible to cite, for example, a method in which ID cards are used and are read, a method in which bar codes are used and are read, or a method in which an input is made through a keyboard.

Thus, the office-supplies managing apparatus 1 updates the stock information and the user information each time the office supplies are supplied.

Furthermore, the office-supplies managing apparatus 1 is provided with a function 34 of outputting user information whereby when a user-information request command is transmitted thereto from the terminal 2 for a member, the user information stored in the user-information storage unit is outputted to the terminal 2 for a member.

In addition, the office-supplies managing apparatus 1 is also provided with a function 32 of preparing a list of results of use by each user group whereby, on the basis of the member affiliation information, the quantities of office supplies supplied by each user group or department, which are specified by the member affiliation information, are calculated, and the quantities of office supplies supplied by each user group or department is stored in the user-information storage unit 30 as the user information. For this reason, a list of results of use by each user group, which indicates the quantities of office supplies supplied by each user group or department, is transmitted by means of the function 34 of outputting user information to the terminal 2 for a member from which a request for the information has been made.

Further, the office-supplies managing apparatus 1 is provided with a function 33 of preparing a list of average results of use whereby, on the basis of the member affiliation information, the average quantity of office supplies supplied per member for a fixed period is calculated, and the average quantity of office supplies supplied is stored in the user-information storage unit 30 as the user information. Accordingly, a list of average results of use, indicating the average quantity of office supplies supplied per member for, e.g., one month, is transmitted by means of the function 33 of preparing a list of average results of use to the terminal 2 for a member from which a request for the information has been made.

For this reason, a member in charge of management or the like is capable of readily obtaining this user information through the terminal 2 close at hand at any time.

Figure 5:
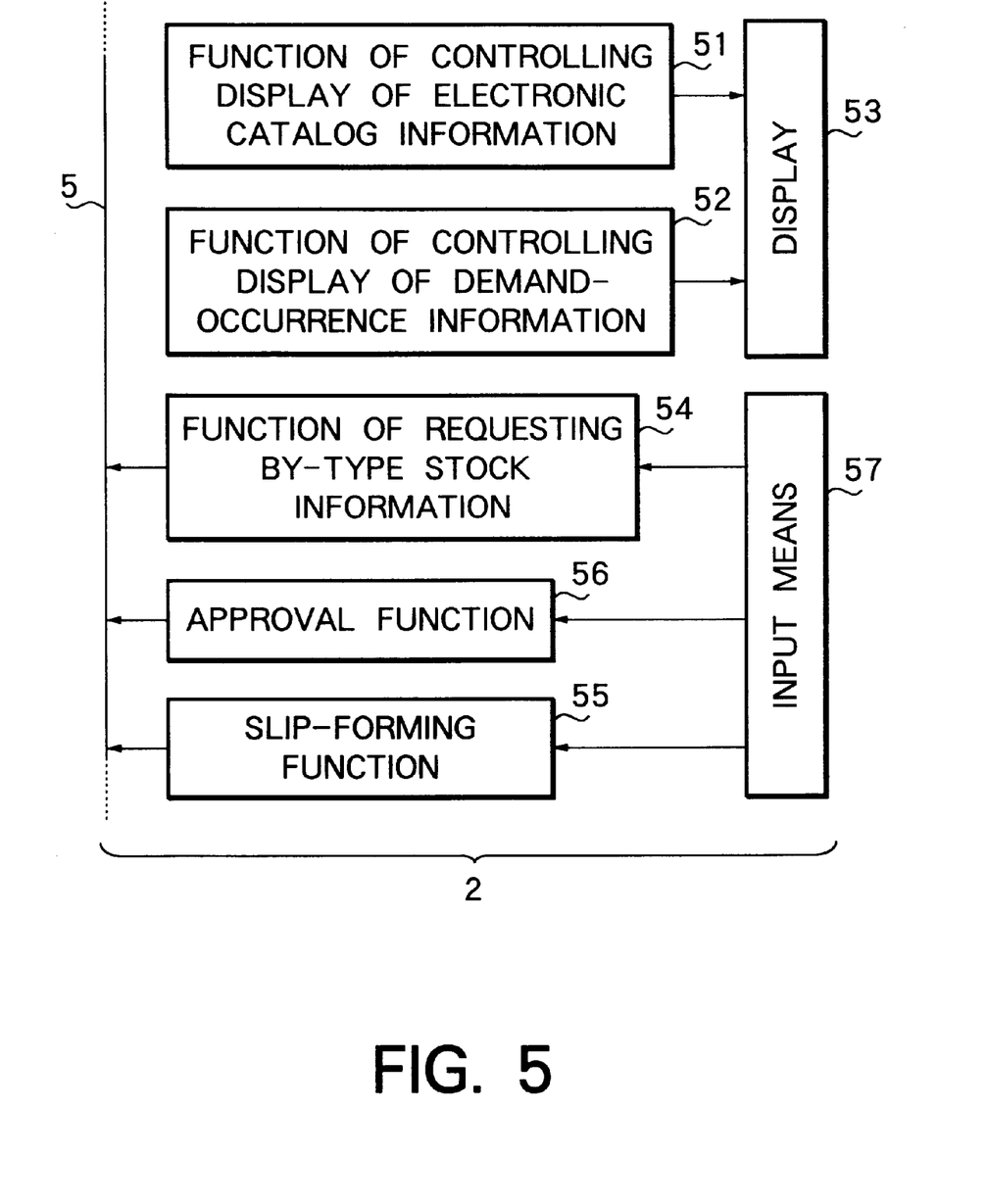
FIG. 5 is a block diagram illustrating a configuration of various functions of a terminal for a member.

FIG. 5 shows a block diagram illustrating a configuration of the terminal 2 for a member. In this drawing, the terminal 2 for a member is provided with the following: a display 53 for displaying characters and figures; an input means 57 such as a keyboard or a mouse through which the member enters data; a function 51 of controlling the display of electronic catalog information so as to output to the display 53 electronic catalog information in which types of various office supplies arranged in the OSC 4 as permanently stocked products are stored; and a function 54 of requesting by-type stock information so as to output as office supply codes the types of office supplies entered by the member together with a stock-information request command to the office-supplies managing apparatus 1 in correspondence with the electronic catalog information displayed on the display 53.

This function 54 of requesting by-type stock information permits the confirmation of the stock by type of office supplies by means of the terminal 2 for a member. In this example, the terminal 2 for a member is provided with the names of the office supplies and their codes as the electronic catalog information. In addition, graphic data using photographs and the like of the office supplies may also be included, with the result that the input operation by persons who are not familiar with the operation can be facilitated.

The function 51 of controlling the display of electronic catalog information displays the electronic catalog information on the display on the basis of a command from a member. Here, the display of the names of permanently stocked products, which are permanently stocked in the OSC 4, and graphic data showing the office supplies is controlled. Consequently, it becomes possible to specify the office supplies on which stock information is required.

The member designates the name of the permanently stocked product, the code, or graphic data, and effects the operation of transmitting a stock-information request command to the office-supplies managing apparatus 1. Then, the function 54 of requesting by-type stock information transmits the office supply code and the stock-information request command to the office-supplies managing apparatus 1.

Correspondingly, as shown in FIG. 3, the office-supplies managing apparatus 1 is provided with a function 27 of retrieving by-type stock information so as to retrieve stock information on the office supplies corresponding to the relevant office supply code from the stock-information storage unit 20 on the basis of the office supply code transmitted from the function 54 of requesting by-type stock information. For this reason, the office-supplies managing apparatus 1 acquires the stock information on the relevant office supply code. Then, the stock information on the relevant office supply code is transmitted to the terminal 2 for a member by means of the function 26 of outputting stock information. Accordingly, the amount of data transmitted through the network 5 becomes minimal.

Next, a description will be given of the nonpermaently stocked products.

As shown in FIG. 5, the terminal 2 for an ordinary member is provided with a slip-forming function 55 for transmitting demand-occurrence information on nonpermanently stocked products, which are not stocked as the permanently stocked products in the OSC 4, to another terminal 2 for a predetermined member.

In addition, the terminal 2 for a member having the authority of giving approval to nonpermanently stocked products is provided with a function 52 of controlling the display of demand-occurrence information so as to output the demand-occurrence information to the display 53 upon receiving the demand-occurrence information outputted by the slip-forming function 55, as well as an approval function 56 for outputting to the outside the approval information, inputted in response to the demand-occurrence information, together with the demand-occurrence information.

As for the nonpermanently stocked products, in response to the occurrence of the demand, information is transmitted from the terminal 2 for a member disposed close to the member who made the request, and his or her superior approves the request by using the terminal 2 for a member having the approval function 56, and the approval is transmitted to the terminal 2 for a member 2 in charge of purchasing in the organization. In addition, in a case where a paper medium is used, the member who makes the request forms a slip, and after approval by his or her superior, the slip is sent to the personnel in charge of purchasing. The personnel in charge of purchasing imparts an order number to the slip, and places an order with a supplier after going through a predetermined procedure.

The personnel in charge of purchasing registers a scheduled delivery date and an order number to the office-supplies managing apparatus 1. The office-supplies managing apparatus 1 transmits the scheduled delivery date and the order number to the terminal 2 for a member who outputted the demand-occurrence information (the function of transmitting the scheduled delivery information), and updates the stock information. Here, if the stock is set to "0," thereby to correspond to the stock-information request command from the terminal 2 for a member who issued an order for the relevant nonpermanently stocked products.

For this reason, the member who created the demand for the nonpermanently stocked products is capable of issuing an order for the nonpermanently stocked products simply by operating the terminal 2 close at hand, and is capable of automatically knowing the scheduled delivery data. Further, it also becomes possible to check the arrival of products through a stock-information request command.

Figure 6:
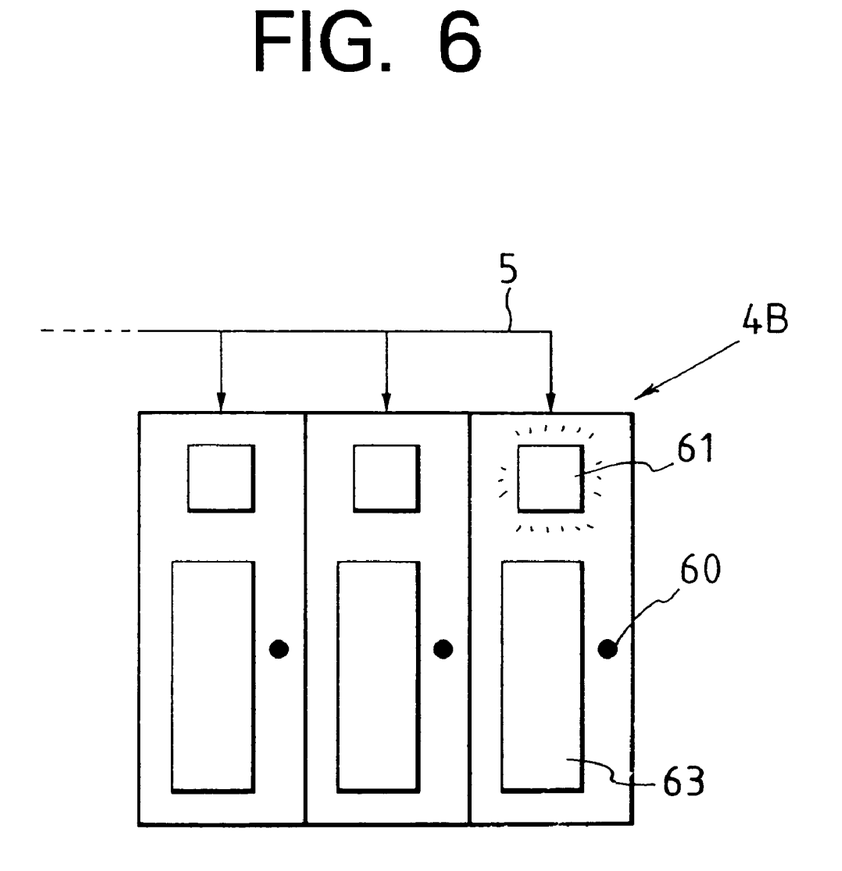
FIG. 6 is a front elevational view illustrating the arrangement of lockers.

As for the reception of the relevant nonpermanently stocked products, a supplier supplies the products into a hinged-type locker among the several lockers 4B installed in the OSC 4 in the manner of a post-office box. At the same time, the supplier inputs stocking-in processing data into the office-supplies managing apparatus 1. In the stocking-in processing of the nonpermanently stocked products, the order number is used as the key code of a commodity. The order number is an essential item, and the post-office box number of the locker 4B is also inputted. Here, the fact that the product can be supplied may be outputted to the terminal 2 for a member when arrival processing is effected.

As shown in FIG. 6, the lockers 4B are provided so that nonpermanently stocked products which are not stocked in the OSC 4 as permanently stocked products can be stored. Each of the lockers 4B has an opening/closing controlling means 60 which is unlocked when a predetermined unlocking command is received, and a display means 61 which lights up when the opening/closing controlling means 60 is unlocked.

Correspondingly, as shown in FIG. 3, the office-supplies managing apparatus 1 is provided with a function 25 of supplying nonpermanently stocked products so as to output an unlocking command to the locker 4B when the order number of the nonpermanently stocked product is inputted, and to update the stock information in the stock-information storage unit 20.

The locker 4B has the opening/closing controlling means 60 capable of setting a unlocking condition from a remote place on each such condition, as well as a window 63 for viewing the inner contents. The opening/closing controlling means 60 is connected to the office-supplies managing apparatus 1 in the OSC 4 by means of communication, and is unlocked by the inputting of the order number on a screen for the processing of paying-out and stocking-out of the nonpermanently stocked product. Then, the display means 61 on the locker 4B lights up, and the position is indicated. Incidentally, the lit-up display is turned off as the door is closed.

As described above, in accordance with this embodiment, the processing of information centering on stock information, including the supply, inventory-taking, determination of quantities to be replenished, and the supplying of nonpermanently stocked products, becomes possible. On the basis of this processing, control of the consumption of office supplies can be facilitated by the calculation of various results of use of office supplies centering on the user information. Moreover, the unattended supply of nonpermanently stocked products by making maximum use of the terminals 2 for a member becomes possible by means of the slip-forming function, the approval function, and the lockers 4B installed in the OSC 4. Thus, personnel for management of the supply of office supplies becomes unnecessary, and the supply of office supplies to the members can be effected easily. Further, approval processing of nonpermanently stocked products can be effected speedily, and clear data for controlling the volume of consumption of office supplies can be supplied to personnel in charge of management.

In addition, in actual application, the ownership of the stocked products can be determined as being either products purchased by the organization or the stock entrusted by the supplier through a contract with the supplier.

In the former case, purchase takes place at the time of replenishment of the commodities, while in the latter case, purchase takes place at the time of taking out and stocking out. As for the inventory-taking differential, it suffices if a handling method is determined in advance.

Through these functions, the attendance for acceptance, stock control, the procedure of ordering permanently stocked products, delivery date control, reception of goods, and other operations can be eliminated from the operations of the personnel in charge of "business operations concerning the management and supply of office expendables."

Incidentally, although business operations concerning charging and payment generally remain, since all the data is recorded in the office-supplies managing apparatus 1, it is possible to obtain traces from various angles and to conduct ex post facto analysis.

In accordance with the present invention arranged and operated as described above, by means of the functions of updating the stock at the time of stocking-in and supplying, the office-supplies managing apparatus ascertains the codes of office supplies and updates the stock information each time the office supplies are stocked in and supplied, and by means of the function of outputting stock information, the office-supplies managing apparatus outputs the stock-related information stored in the stock-information storage unit upon receipt of a stock-information request command transmitted from the terminal for a member. Therefore, the members are capable of confirming the stock in an office-supplies supplying area simply by operating the terminals at hand. In addition, since the office-supplies managing apparatus together with the office supplies is disposed in the office-supplies supplying area in which entrance and exit of members are controlled by the entering/exiting member control apparatus which is unlocked when a specific member identification code is inputted, it is possible to provide an office-supplies management system which offers an unprecedentedly outstanding advantage in that the management and supply of office supplies within an organization can be formed into a system.

What is claimed is:

1. An office-supplies management system comprising:
an office-supplies managing apparatus disposed together with office supplies in an office-supplies supplying area in which entrance and exit of members are controlled by an entering/exiting member control apparatus which is unlocked when a specific member identification code is inputted; and
a plurality of terminals for members connected to said office-supplies managing apparatus through a network,
wherein said office-supplies managing apparatus includes a stock-information storage unit for storing stock-related information such as information on a stock of office supplies which are supplied to the members, a function of updating the stock at the time of stocking-in and supplying for ascertaining codes of office supplies and updating stock information when the office supplies are replenished and stocked into the office-supplies supplying area, and when the office supplies are supplied, and a function of outputting stock information for outputting the stock-related information stored in said stock-information storage unit upon receipt of a stock-information request command transmitted from said terminal for a member, wherein said terminal for a member is provided with a function of controlling the display of electronic catalog information so as to output electronic catalog information in which types of various office supplies arranged in the office-supplies supplying area as permanently stocked products are stored; a display for displaying the electronic catalog information outputted by said function of controlling the display of electronic catalog information; and a function of requesting by-type stock information so as to output as office supply codes the types of office supplies entered by the member together with the stock-information request command to said office-supplies managing apparatus in correspondence with the electronic catalog information displayed on said display, wherein said office-supplies managing apparatus is provided with a function of retrieving by-type stock information so as to retrieve stock information on the office supplies corresponding to a relevant office supply code from said stock-information storage unit on the basis of the office supply code transmitted from said function of requesting by-type stock information, wherein said terminal for a member is provided with a slip-forming function for transmitting demand-occurrence information on nonpermanently stoked products, which are not stocked as the permanently stocked products in the office-supplies supplying area, to another terminal for a predetermined member, a function of controlling the display of demand-occurrence information so as to output the demand-occurrence information to said display upon receiving the demand-occurrence information outputted by said slip-forming function, and an approval function for outputting to the outside approval information, inputted in response to the demand-occurrence information, together with the demand-occurrence information.

2. An office-supplies management system comprising:
an office-supplies managing apparatus disposed together with office supplies in an office-supplies supplying area in which entrance and exit of members are controlled by an entering/exiting member control apparatus which is unlocked when a specific member identification code is inputted; and
a plurality of terminals for members connected to said office-supplies managing apparatus through a network,
wherein said office-supplies managing apparatus includes a stock-information storage unit for storing stock-related information such as information on a stock of office supplies which are supplied to the members, a function of updating the stock at the time of stocking-in and supplying for ascertaining codes of office supplies and updating stock information when the office supplies are replenished and stocked into the office-supplies supplying area, and when the office supplies are supplied, and a function of outputting stock information for outputting the stock-related information stored in said stock-information storage unit upon receipt of a stock-information request command transmitted from said terminal for a member, wherein a plurality of lockers for storing nonpermanently stocked products which are not stocked as the permanently stocked products are installed in the office-supplies supplying area, each of said lockers including opening/closing controlling means which is unlocked upon receipt of a predetermined unlocking command and display means which lights up when said opening/closing means is unlocked, and wherein said office-supplies managing apparatus is provided with a function of supplying nonpermanently stocked products so as to output the unlocking command to said locker when an order number of the nonpermanently stocked product is inputted, and to update the stock information in said stock-information storage unit.

3. An office-supplies management system comprising:

an office-supplies managing apparatus disposed together with office supplies in an office-supplies supplying area in which entrance and exit of members are controlled by an entering/exiting member control apparatus which is unlocked when a specific member identification code is inputted; and a plurality of terminals for members connected to said office-supplies managing apparatus through a network, wherein said office-supplies managing apparatus includes a stock-information storage unit for storing stock-related information such as information on a stock of office supplies which are supplied to the members, a function of updating the stock at the time of stocking-in and supplying for ascertaining codes of office supplies and updating stock information when the office supplies are replenished and stocked into the office-supplies supplying area, and when the office supplies are supplied, and a function of outputting stock information for outputting the stock-related information stored in said stock-information storage unit upon receipt of a stock-information request command transmitted from said terminal for a member, wherein said terminal for a member is provided with a function of controlling the display of electronic catalog information in the form of an external storage device so as to output electronic catalog information in which types of various office supplies arranged in the office-supplies supplying area as permanently stocked products are stored; a display for displaying the electronic catalog information outputted by said function of controlling the display of electronic catalog information; and a function of requesting by-type stock information so as to output as office supply codes the types of office supplies entered by the member together with the stock-information request command to said office-supplies managing apparatus in correspondence with the electronic catalog information displayed on said display, and wherein said office-supplies managing apparatus is provided with a function of retrieving by-type stock information so as to retrieve stock information on the office supplies corresponding to a relevant office supply code from said stock-information storage unit on the basis of the office supply code transmitted from said function of requesting by-type stock information.

\* \* \* \* \*